(12) United States Patent
Chi et al.

(10) Patent No.: US 8,156,135 B2
(45) Date of Patent: Apr. 10, 2012

(54) METHOD AND SYSTEM FOR PROGRESSIVE DISCLOSURE OF SEARCH RESULTS

(75) Inventors: Liang-Yu Chi, San Francisco, CA (US); Karon A. Weber, San Francisco, CA (US); Samantha M. Tripodi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 653 days.

(21) Appl. No.: 11/644,734

(22) Filed: Dec. 22, 2006

(65) Prior Publication Data
US 2008/0154859 A1   Jun. 26, 2008

(51) Int. Cl.
*G06F 7/00* (2006.01)
*G06F 17/30* (2006.01)

(52) U.S. Cl. .................. 707/765; 707/767
(58) Field of Classification Search .............. None
See application file for complete search history.

(56) References Cited

U.S. PATENT DOCUMENTS

| | | | |
|---|---|---|---|
| 6,188,010 B1* | 2/2001 | Iwamura | 84/609 |
| 6,691,104 B1* | 2/2004 | Kraft et al. | 1/1 |
| 6,978,264 B2* | 12/2005 | Chandrasekar et al. | 1/1 |
| 7,225,184 B2* | 5/2007 | Carrasco et al. | 1/1 |
| 7,231,405 B2* | 6/2007 | Xia | 1/1 |
| 7,236,969 B1* | 6/2007 | Skillen et al. | 707/3 |
| 2002/0103788 A1* | 8/2002 | Donaldson et al. | 707/3 |
| 2003/0120646 A1* | 6/2003 | Littlefield et al. | 707/3 |
| 2004/0139186 A1* | 7/2004 | Lee et al. | 709/223 |
| 2006/0129536 A1* | 6/2006 | Foulger et al. | 707/3 |
| 2006/0200556 A1* | 9/2006 | Brave et al. | 709/224 |
| 2008/0114751 A1* | 5/2008 | Cramer et al. | 707/5 |

OTHER PUBLICATIONS

Wikipedia. (2007). "Ajax (programming)," located at <http://en.wikipedia.org/wiki/AJAX>, last visited on Mar. 14, 2007, (7 pages).
Yahoo! (2005). "Y!Q Beta Examples," located at <http://yq.search.yahoo.com/publisher/examples.html>, last visited on Apr. 25, 2007, (3 pages).
Yahoo! (2005). "Y!Q Beta for Publishers," located at <http://yq.search.yahoo.com/publisher/embed.html>, last visited on Apr. 25, 2007, (10 pages).
Yahoo! (2007). "Yahoo! Search—Web Search," located at <http://search.yahoo.com/>, last visited on Apr. 25, 2007, (1 page).

* cited by examiner

*Primary Examiner* — Charles Rones
*Assistant Examiner* — Daniel Kuddus
(74) *Attorney, Agent, or Firm* — James J. DeCarlo; Greenberg Traurig, LLP

(57) ABSTRACT

Method and system for progressive disclosure of search results are disclosed. The method includes receiving a first search query from a user, and presenting a first search result page to the user in response to the first search query, where the first search result page includes a first set of search results categorized into a first set of search result topics related to the first search query. The method further includes receiving a second search query from the user, where the second search query includes the first search query, and presenting a second search result page to the user, where the second search result page includes a second set of search results derived from the first set of search result topics and from the second search query.

19 Claims, 6 Drawing Sheets

Figure 1
(Prior Art)

METHOD AND SYSTEM FOR PROGRESSIVE DISCLOSURE OF SEARCH RESULTS

FIELD OF THE INVENTION

The present invention relates to the field of Internet applications. In particular, the present invention relates to a method and system for progressive disclosure of search results.

BACKGROUND OF THE INVENTION

In a conventional method for conducting a search on the Internet, a user submits a search query through a search dialog box. In response to the search query, a search engine delivers a search result page (SRP) to the user. FIG. 1 illustrates an SRP generated by this conventional search method.

As shown in FIG. 1, the SRP provides ten search results on the first page and ten additional pages of search results that are related to the search term "Java." Most of the search results on the first page are narrowly focused on one topic—the Java programming language. Meanwhile, the first and third advertisements displayed on this page relate to Java Hotel, which is entirely unrelated to the Java programming language.

One drawback of the conventional SRP is that the information the user is looking for may be hidden in one of the ten pages of search results. For example, the result (also referred to as the "minority result") the user is looking for is Java coffee, not the Java programming language. The user would have to navigate and view multiple pages to find the information of interest. This process is tedious and time-consuming.

Another drawback of the conventional search methodology is that the user interface of the SRP is fixed to the format of a list of text results, and it offers no help to the user to narrow the search to the desired result. Since none of the search results displayed on the first page in FIG. 1 is useful to the user who is looking for information about Java coffee, the user would have to refine the search terms and conduct the search again. The time and effort used for this initial search is wasted.

Yet another drawback of the conventional search methodology is that the search is conducted on a key-word basis. It is done without using any (?) knowledge about the user or taking into consideration the context of the search terms. As a result, the SRP may fail to produce relevant information to the user, and some of the advertisements displayed on the SRP are out of context from the search results presented.

Therefore, there is a need to address the preceding issues of this conventional search methodology and its corresponding conventional SRPs. Specifically, there is a need for a method and system that would provide a progressive disclosure of search results for an online search.

SUMMARY

The present invention relates to a method and system for a progressive disclosure of search results. In one embodiment, this method includes receiving a first portion of a search query from a user, and presenting a first search result page in response. This includes a first set of search results categorized into a first set of search result topics all relating to the first portion of the search query. The method of presenting a first search result page includes analyzing the first portion of the search query and predicting the first set of search results using a set of contextual information, which includes user behavior, user preferences, user environment, and context of the search query. The method further includes receiving a second portion of the search query from the user, and presenting a second search result page that includes a second set of search results derived from the first set of search result topics and from the first and second portions of the search query.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

FIG. 1 illustrates an SRP generated by the conventional search method.

DESCRIPTION OF EMBODIMENTS

Methods and systems are provided for progressive disclosures of online search results. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, logic block, process, etc., is here conceived to be a self-consistent sequence of one or more computer-executed steps or instructions leading to a desired result. The steps are those utilizing physical manipulations of physical quantities. Each step may be performed by hardware, software, firmware, or combinations thereof.

Figure 2A:
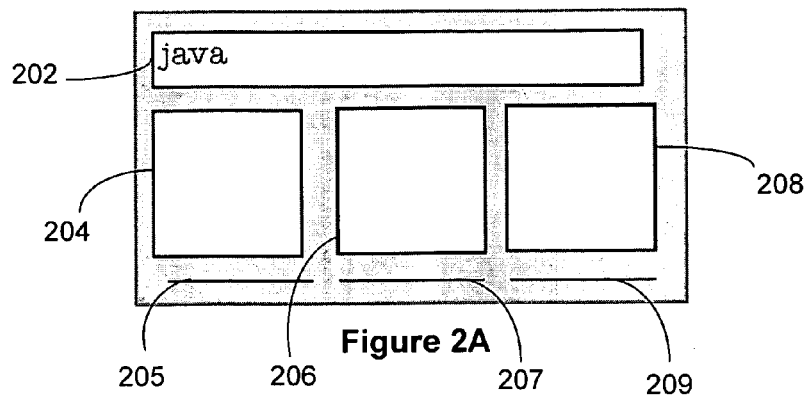
FIGS. 2A-2C illustrate a progressive disclosure application for presenting search results according to embodiments of the present invention.
Figure 2B:
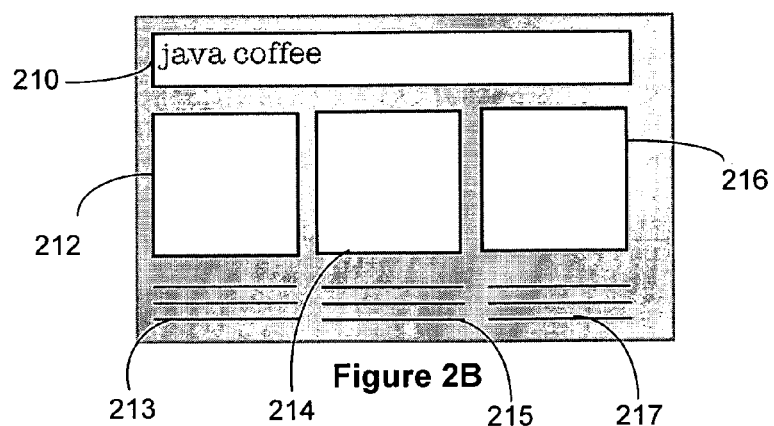
Figure 2C:
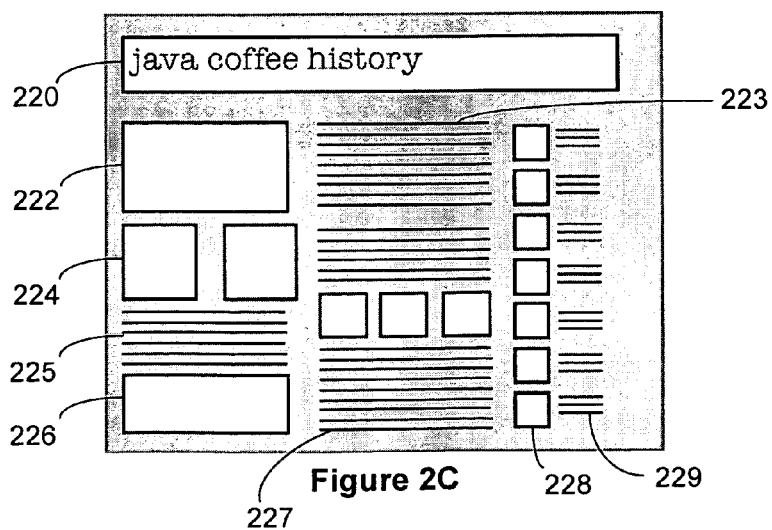

FIGS. 2A-2C illustrate a progressive disclosure application for presenting search results according to embodiments of the present invention. In FIG. 2A, a user enters a search term "Java" in a search box 202. In response to this search query, the progressive disclosure application (also referred to as the "application") presents a high-level overview of a set of categories of search results as represented by boxes 204, 206, and 208. Each category of the search result may include a brief description of the category, which is represented by the lines 205, 207, and 209, respectively. The metaphor of this presentation is similar to that of a baseball card, which provides a pictorial display of common and minority result categories to help the user to disambiguate potential results at this initial stage of the search-term entry process. In this example, the user starts a search with a simple search term Java. A set of high-level summaries may be provided in the form of a baseball card that allows the user to further distinguish the possible categories of information being searched, such as Java the country, Java the coffee, or Java the programming language.

FIG. 2B illustrate a progressive disclosure application that updates search results interactively according to an embodiment of the present invention. In FIG. 2B, as the user continues to update the search query by entering a second search term "coffee," the display of the search-result categories also updates adaptively in response to the new search string "Java coffee" (210). As a result, the new search result categories include boxes 212, 214, and 216, and their corresponding descriptions in boxes 213, 215, and 217, respectively. The metaphor of this presentation is similar to that of a trip guide, which provides a set of detailed clusters of related topics that are summarized at this intermediate stage as finding aids for the search-term entry process.

In the example of FIG. 2B, as the user continues to enter additional search terms, the application uses such terms to predict what the user is searching for. For example, when the user types "coffee", the application dynamically updates the search-result categories to guide the user in determining what the user wants to know about Java the coffee in terms of: 1) how it is made, 2) how it is brewed, 3) to what temperature it is brewed, and 4) what type of coffee pot is used. Each of these questions may be presented as a category in one of the boxes 212, 214, or 216.

Figure 1:
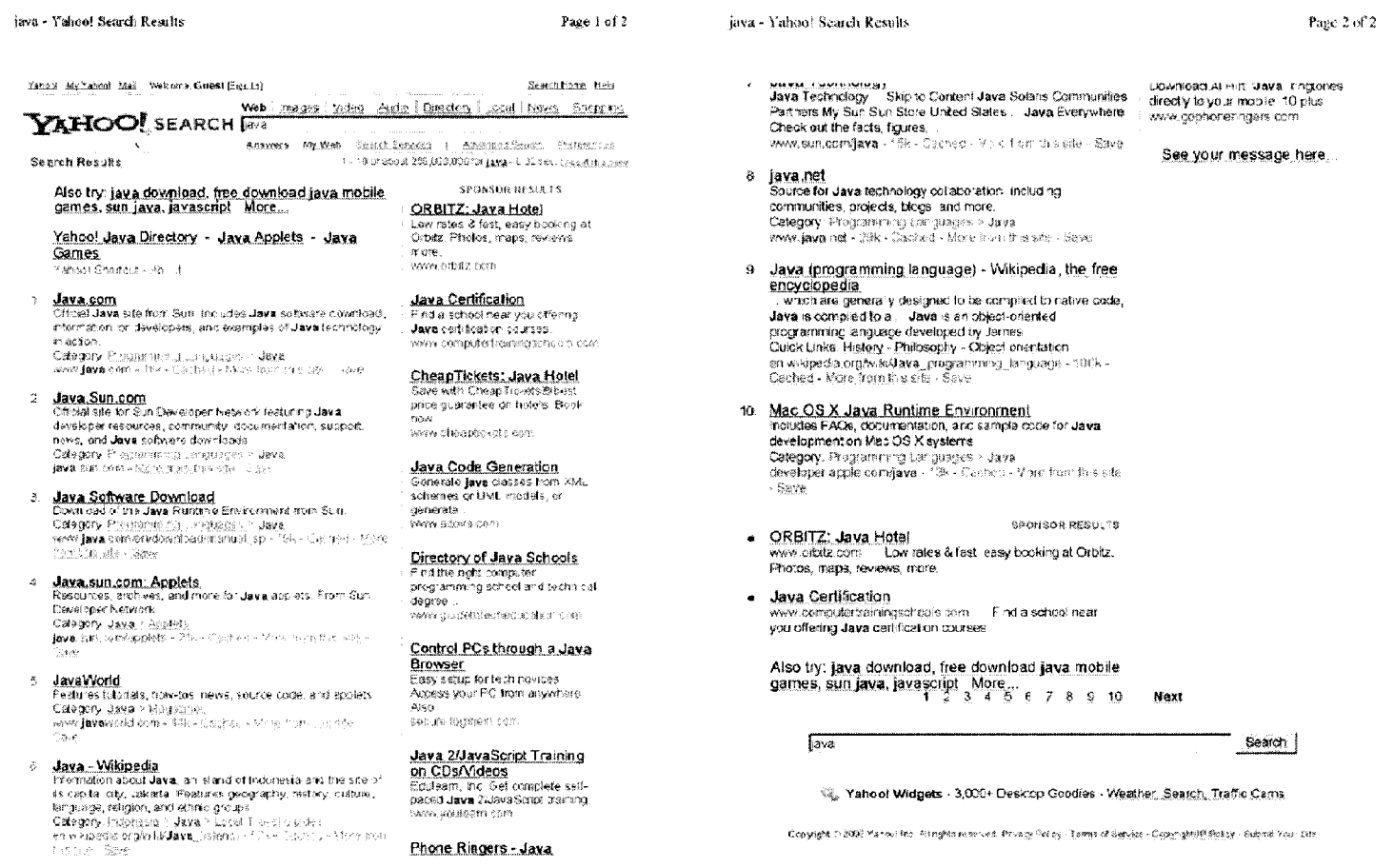

Note that the visibility of the minority result has increased significantly. Java coffee may be displayed next to the Java programming language. The user may now scan the broad categories provided and quickly go to the minority results/categories that normally would have come much later in the SRPs of FIG. 1, which the user may never access as they are hidden underneath multiple pages of unrelated search results.

FIG. 2C illustrates a progressive disclosure application that further refines search results interactively according to an embodiment of the present invention. In this example, as the user continues to update the search query by entering a third search term "history," the application further refines the SRP in response to the new search string "Java coffee history" (220). In one approach, the search-result categories are further narrowed to fewer areas of interest as represented by blocks 222, 224, 226, and 228. The corresponding descriptions associated with these blocks are represented by text areas 223, 225, 227, and 229, respectively. The metaphor of this presentation is similar to that of an encyclopedia, which provides a set of editorial presentations of concepts that present the breadth and depth of the knowledge around a single topic at this later stage of the search-term entry process. Note that in each stage of the search from FIG. 2A-2C discussed above, the application not only narrows the number of search results, it also dynamically adapts the display of the SRP to the user.

In FIG. 2C, when the application receives the search term "Java coffee history," it uses this information, along with other contextual information about the user, to further narrow the search dynamically, and adaptively displays an updated SRP about "Java coffee history" in the form of an encyclopedia, which represents the depth and breadth of information being searched by the user. In one aspect, the application may deliver an SRP that is rich in media content and more useful to the user than the conventional SRP of FIG. 1, which is mostly text-based. The media-rich SRP packages information about "Java coffee history" so that the user would not have to read multiple pages in order to access the information.

In one aspect, the application would adapt the advertisements on the SRP to fit the context of the search results being presented. In this example, instead of displaying advertisements for Java programming language products, the advertisements would focus on Java coffee-related products, such as different brands of Java coffee beans, coffee grinders, etc.

Furthermore, different content-specific widgets may be employed to assist the user with subsequent search and narrowing operations. According to the types of information presented in the different clusters of the SRP, content-specific widgets may be used to assist the user to navigate the different types of information displayed. For example, a price-comparator widget may, to a user, be useful to compare the prices of different brands of Java coffee beans, which would be irrelevant if the user is searching for information relating to Java programming language. In another example, a widget that would allow a user to examine the different degrees of darkness in Java coffee beans could also be useful. In other words, the progressive disclosure application may provide the appropriate widgets in a progressive manner as it learns additional information about the context within which the user's search is conducted.

In various embodiments, the progressive disclosure application of the present invention implements Web 2.0 functionalities using a combination of HTML, CSS, JavaScript, Asynchronous JavaScript and XML (AJAX), Y!Q, Yahoo! Widget Engine, and Yahoo! Toolbar for Internet Explorer.

Figure 3A:
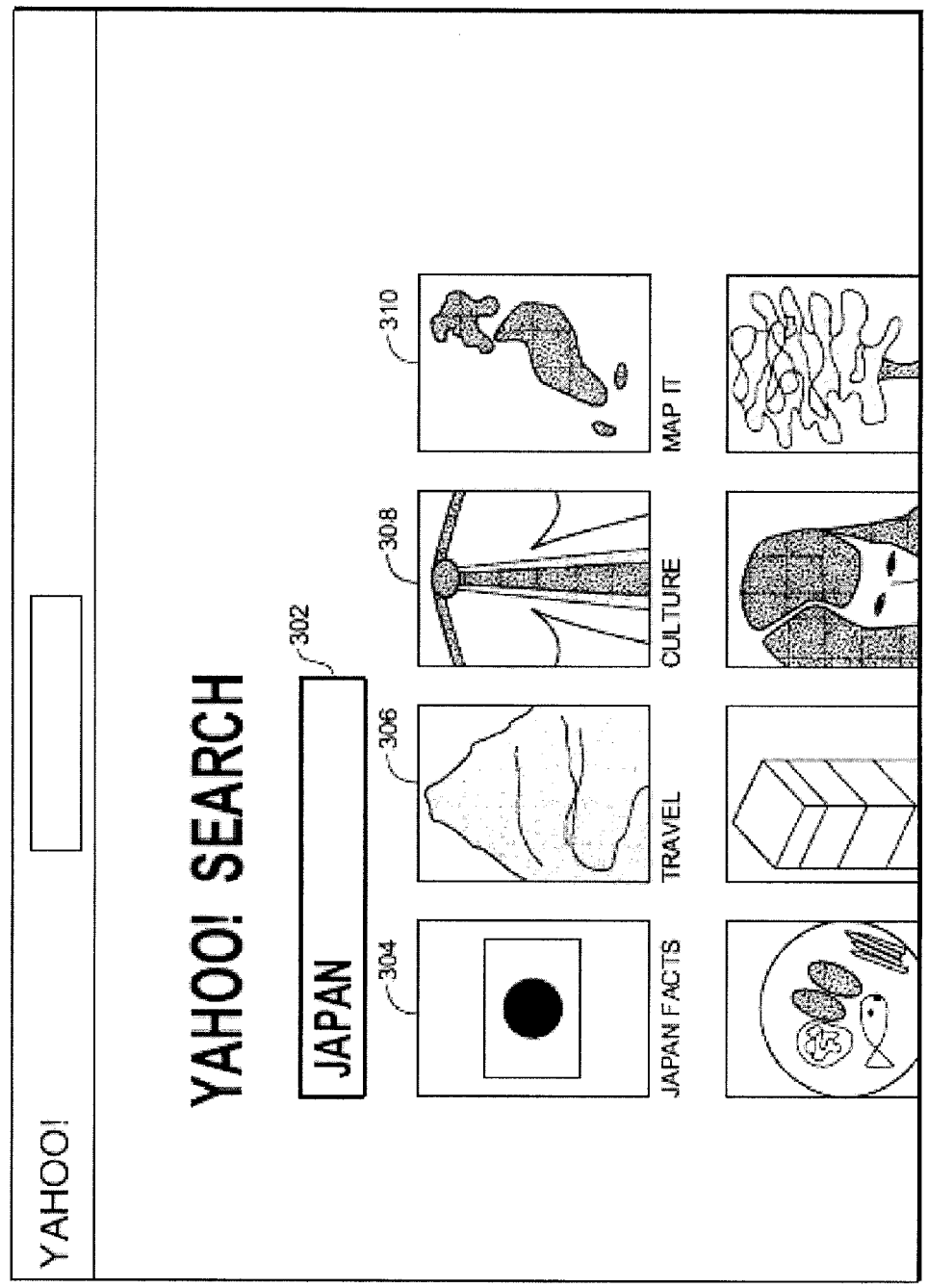
FIGS. 3A-3C illustrate another example of presenting search results according to embodiments of the present invention.
Figure 3B:
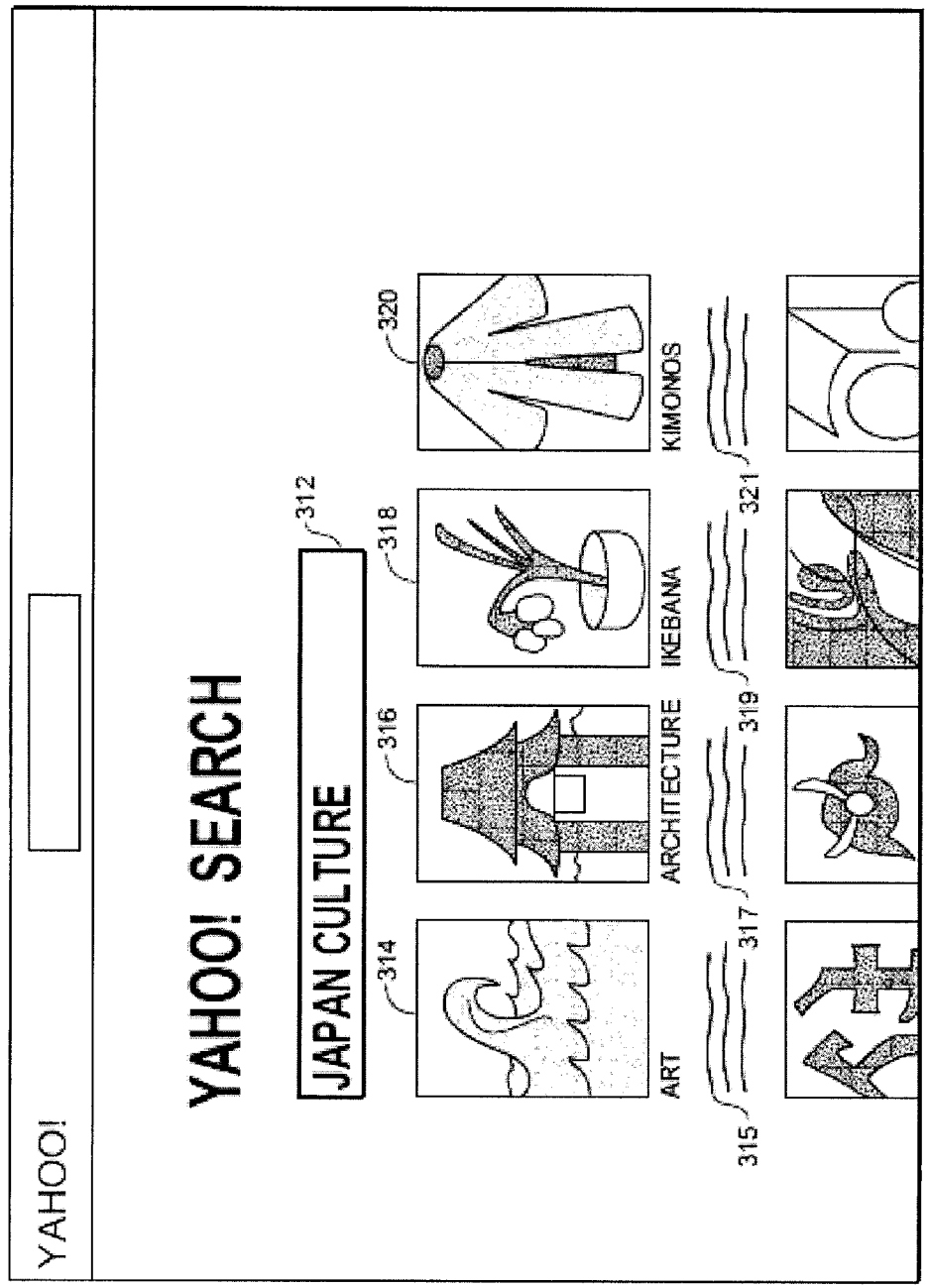
Figure 3C:
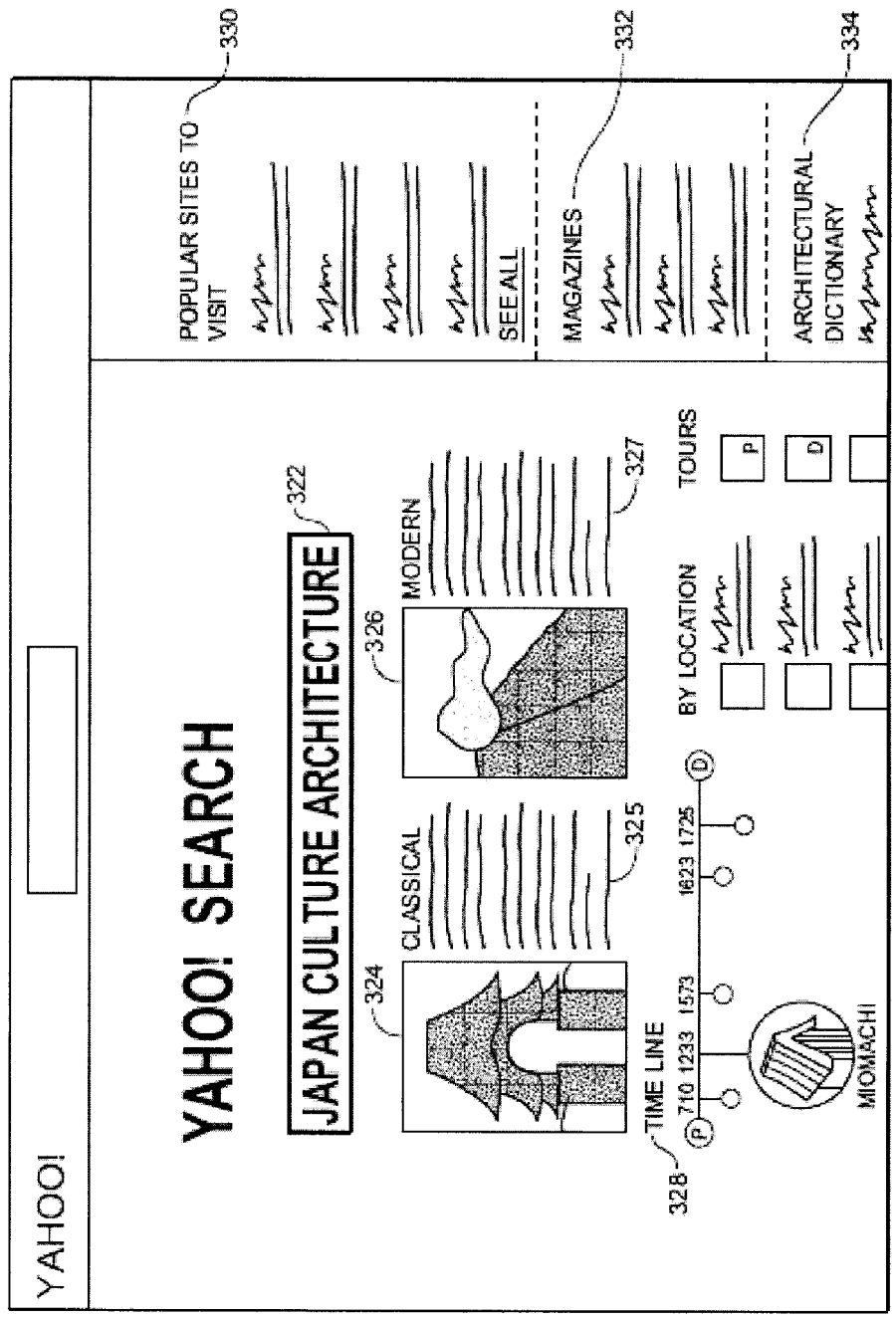

FIGS. 3A-3C illustrate another example of presenting search results according to embodiments of the present invention. In FIG. 3A, the user enters a search query "Japan" in the search dialog box 302. In response to the search query, the application presents a high-level overview of the clusters (also referred to as "categories") of possible search results for the search term "Japan." The possible search results may include clusters of information about Japan, such as Japan Facts (304), Travel (306), Culture (308), Map (310), etc. In this example, the category of information about Japan Facts may be represented by a symbol of the Japanese flag. Similarly, the cluster of information on Travel may symbolically be represented by Mount Fuji; the category regarding Culture, by an image of a Kimono; and the category about Maps, by a map of Japan.

In FIG. 3B, as the user updates the search query by entering a second search term "culture," the display of the search result categories is also updated in response to the new search string "Japan culture" (312). The updated search result categories include Art (314), Architecture (316), Ikebana (318), and Kimono (320). The corresponding descriptions associated with the updated search-result categories may be represented by the text areas 315, 317, 319, and 321, respectively.

In FIG. 3C, as the user continues to update the search query by entering a third search term "architecture," the SRP is further refined in response to the new search string "Japan culture architecture" (322). In this example, the search result categories are further narrowed to two main areas, namely Classical (324) and Modern (326). The corresponding descriptions associated with the Classical and Modern categories are represented by text areas 325 and 327, respectively. Additional search results may be presented to the user, such as a Timeline (328) relating to the history of "Japan culture architecture," popular web sites (330), magazines (332), and architectural dictionaries (334) relating to the search topic, etc.

In one aspect, the SRP shown in FIG. 3C no longer follows the conventional method of displaying just text information. Instead, the application generates visualizations that best represents the user's interest and provides content-specific widgets, such as the timeline widget of the history of "Japan culture architecture," to assist the user to further navigate the SRP. The changes in user interface of the SRP of FIG. 3C and the content-specific widgets enhance the ease-of-use of the search results.

Note that it would not be useful to provide a timeline of Japan in the display of FIG. 3A. The application would not know what information to put on the timeline prior to ascertaining the user's search context. For example, it would not be helpful to put the entire history of Japan in the timeline if the user is interested in a Sumo wrestling event that will take place next week. The timeline widget would not be relevant to the user at this point. In such a situation, the application may refrain from invoking the timeline widget until the context of the search results is assured. The application would show the relevant information only when this degree of assurance is established.

In another aspect, the application exposes to the user a range of topics relating to the search query. The user may not necessarily know at the beginning what he is looking for. Using the progressive disclosure application, the user is aided by searching hints to find the particular information of interest.

As discussed above in association with FIG. 2C, targeted advertisements may be provided to closely track the changes in context of the user's search. As the context changes, the application may adaptively change the advertisements displayed on the SRP. For example, when the user initially enters the search term "Japan" in FIG. 3A, the advertisements shown on the SRP may relate to airline promotions for purchase of air tickets to Japan. As the search progresses, such as after the user enters the search term "Japan Culture Architecture" in FIG. 3C, the SRP adapts to display advertisements relating to maps of temples built between certain historical periods in Japan.

In the conventional search method, the search is based on keywords of the search query. However, a keyword may have a few different meanings. For example, the word Jaguar may mean the animal, the brand of a luxury car, the Mac OS X, etc. To advertise a product, a company would have to buy the keyword, which may carry different meanings unrelated to the company's product. Since the progressive disclosure application tracks the levels of a search conducted by the user, it is able to adapt advertisements in accordance with the context of the search and enables more focused advertisements by companies. By using the progressive disclosure approach, an Internet content provider may sell advertisements based on the context of a user's search, and avoid the traditional advertisement model of selling a keyword to one company.

Figure 4:
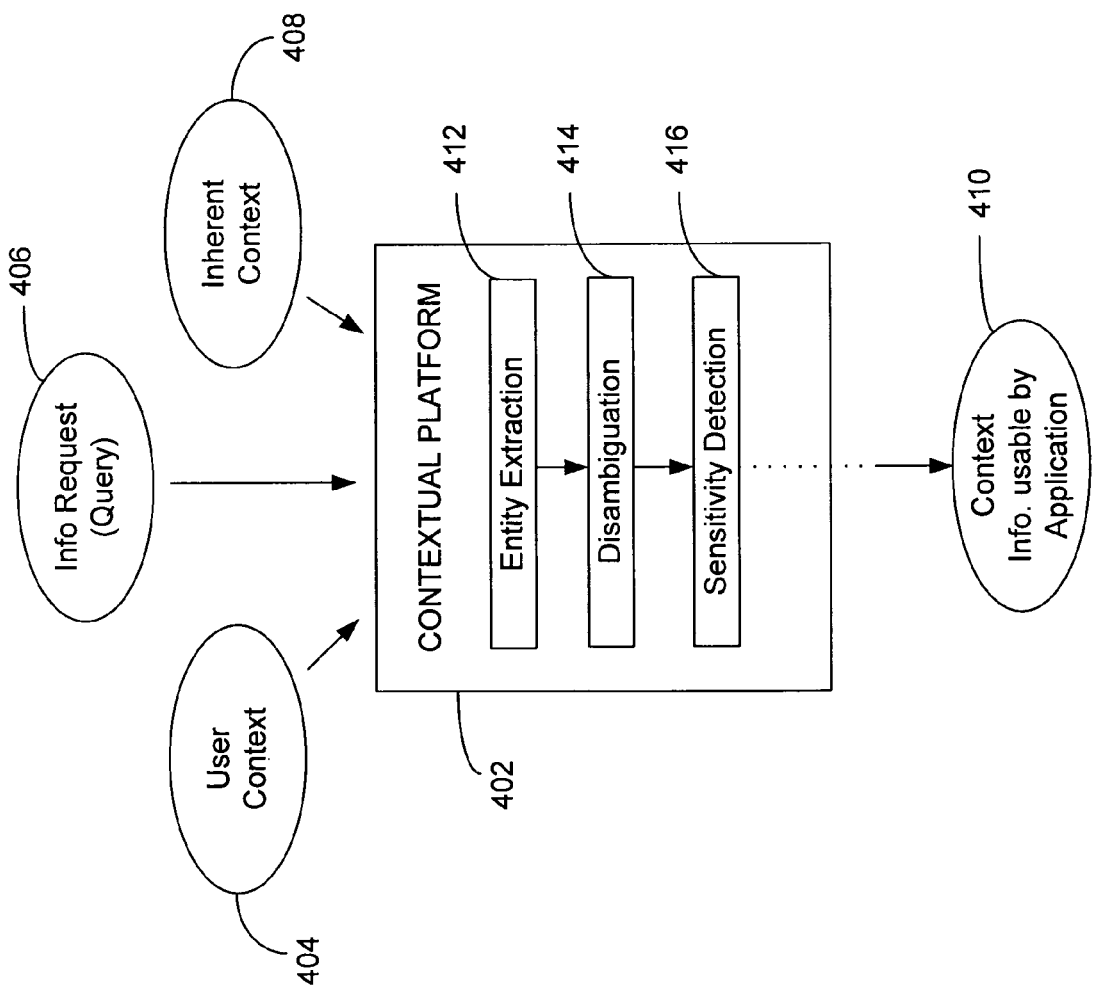
FIG. 4 illustrates a method of search using contextual information according to an embodiment of the present invention.

FIG. 4 illustrates a method of search using contextual information according to an embodiment of the present invention. As shown in FIG. 4, a contextual platform (402) receives contextual input from various sources, including user context (404), search query (406), and inherent context (408), to generate contextual information to be used by the application (410) for conducting the searching and displaying of search results. The contextual platform includes three main functions, namely entity extraction (412), disambiguation (414), and sensitivity detection (416).

In one approach, the user context may include user behavior, preference, user environment, history of information requested, etc. In addition, the user context (404) may be derived from the user's interactions with the application. The application may use such user interactions to identify search results that would fit within the search query entered by the user thus far and also the concepts that the user is trying to reach. The application may also use the information from the user interaction to feed the user the appropriate modification widgets, display widgets, etc., so that user can search deeper and closer to a specific information of interest. In addition, the user interaction information allows the application to alter the way that the search results may be displayed to best help the user to differentiate and find other relevant information among the various competing concepts or results.

In another approach, the context of the search query may be derived from the user's interactions with the updated SRPs. As the user performs various operations with the SRPs, the progressive disclosure application gains additional context about what the user's intent is, and adapts the user interface progressively to show the user more narrowed information the application predicts the user would need in order to accomplish the search, based on that entire history of user activities from the point the user first types a word or clicks on a cluster of search results on the SRP. In yet another approach, the inherent context (408) may include the type of user device (e.g., mobile versus desktop), type of browser, date, time, physical location, weather, season, etc. The user may also provide user-defined context, such as query log, widget interaction, click patterns, hover time, etc.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

What is claimed is:

1. A method comprising:
   receiving, by a computer processor, a first search query from a user;
   presenting, via the computer processor, a first search result page to the user in response to the first search query, wherein the first search result page includes a first set of search results comprising a first set of search result categories related to the first search query;

providing, via the computer processor, a first content-specific widget on the first search result page, the first content-specific widget configured to navigate a first type of information in one of the first set of search result categories, wherein the first content-specific widget is provided in response to a first search context;

receiving, at the computer processor, a second search query from the user, wherein the second search query includes the first search query and a characteristic associated with a first category from the first set of search result categories;

presenting, via the computer processor, a second search result page to the user, wherein the second search result page includes a second set of search results comprising a second set of search result categories related to the second search query;

providing, via the computer processor, a second content-specific widget on the second search result page, the second content-specific widget configured to navigate a second type of information in one of the second set of search result categories, wherein the second content-specific widget is provided in response to a second search context;

receiving, at the computer processor, a third search query from the user, wherein the third search query includes the second search query and a characteristic associated with a second category from the second set of search result categories; and presenting, via the computer processor, a third search result page to the user, wherein the third search result page includes a third set of search results derived from the second set of search results and from the third search query.

2. The method of claim 1, wherein presenting a first search result page comprises:
analyzing the first search query; and
predicting the first set of search result categories using the first search query and the first search context.

3. The method of claim 2, wherein the first search context comprises a first user context comprising:
user behavior;
user preferences; and
user environment.

4. The method of claim 3, wherein presenting a first search result page further comprises:
presenting a first set of advertisements in response to the first search query and the first user context.

5. The method of claim 1, wherein the second set of search results further comprises:
a summary of the second set of search result categories.

6. The method of claim 1, wherein presenting the second search result page further comprises:
presenting a second set of advertisements in response to the second search query and the second search context.

7. The method of claim 1, wherein the third set of search results comprises:
a detailed description of the second category.

8. The method of claim 1, wherein presenting a third search result page further comprises:
presenting a third set of advertisements in response to the third search query.

9. The method of claim 1, wherein the characteristic is the first category.

10. A non-transitory computer-readable storage media having stored thereon computer readable instructions executable by a processor to cause the processor to perform a method comprising:

receiving a first search query from a user;
presenting a first search result page to the user in response to the first search query, wherein the first search result page includes a first set of search results comprising a first set of search result categories related to the first search query;

providing a first content-specific widget on the first search result page, the first content-specific widget configured to navigate a first type of information in one the first set of search result categories, wherein the first content-specific widget is provided in response to a first search context;

receiving a second search query from the user, wherein the second search query includes the first search query and a characteristic associated with a first category from the first set of search result categories;

presenting a second search result page to the user, wherein the second search result page includes a second set of search results comprising a second set of search result categories related to the second search query;

providing a second content-specific widget on the second search result page, the second content-specific widget configured to navigate a second type of information in one the second set of search result categories, wherein the second content-specific widget is provided in response to a second search context;

receiving a third search query from the user, wherein the third search query includes the second search query and a characteristic associated with a second category from the second set of search result categories; and presenting a third search result page to the user, wherein the third search result page includes a third set of search results derived from the second set of search results and from the third search query.

11. The non-transitory computer-readable storage media of claim 10, wherein the presenting a first search result page comprises:
analyzing the first search query; and
predicting the first set of search result categories results using the first search query and the first search context.

12. The non-transitory computer-readable storage media of claim 11, wherein the first search context comprises a first user context comprising:
user behavior;
user preferences;
user environment.

13. The non-transitory computer-readable storage media of claim 12, wherein the presenting the first search result page further comprises:
presenting a first set of advertisements in response to the first search query and the first user context.

14. The non-transitory computer-readable storage media of claim 10, wherein the second set of search results further comprises:
a summary of the second set of search result categories.

15. The non-transitory computer-readable storage media of claim 10, wherein the presenting the second search result page further comprises:
presenting a second set of advertisements in response to the second search query and the second user context.

16. The non-transitory computer-readable storage media of claim 10, wherein the third set of search results comprises:
a detailed description of the second category.

17. The non-transitory computer-readable storage media of claim 10, wherein the presenting a third search result page further comprises:

presenting a third set of advertisements in response to the third search query.

18. The non-transitory computer readable storage media of claim 10, wherein the characteristic is the first category.

19. A computing device comprising:
a processor;
a memory that stores program logic for execution by the processor, the program logic comprising:
first query receiving logic executed by the processor for receiving a first search query from a user;
first search result logic executed by the processor for presenting a first search result page to the user in response to the first search query, wherein the first search result page includes a first set of search results comprising a first set of search result categories related to the first search query;
first content widget logic executed by the processor for providing first content-specific widget on the first search result page, the first content-specific widget configured to navigate a first type of information in one of the first set of search result categories, wherein the first content-specific widget is provided in response to a first search context;
second query receiving logic executed by the processor for receiving a second search query from the user, wherein the second search query includes the first search query and a characteristic associated with a first category from the first set of search result categories;
second search result logic executed by the processor for presenting a second search result page to the user, wherein the second search result page includes a second set of search results comprising a second set of search result categories related to the second search query;
second content widget logic executed by the processor for providing a second content-specific widget on the second search result page, the second content-specific widget configured to navigate a second type of information in one of the second set of search result categories, wherein the second content-specific widget is provided in response to a second search context;
third query receiving logic executed by the processor for receiving a third search query from the user, wherein the third search query includes the second search query and a characteristic associated with a second category from the second set of search result categories; and
third content widget logic executed by the processor for providing a third search result page to the user, wherein the third search result page includes a third set of search results derived from the second set of search results and from the third search query.

* * * * *